June 2, 1970 R. T. CLEARY 3,515,813
TELEPHONE RINGING SIGNAL TRANSFER DEVICE
Filed Jan. 4, 1968
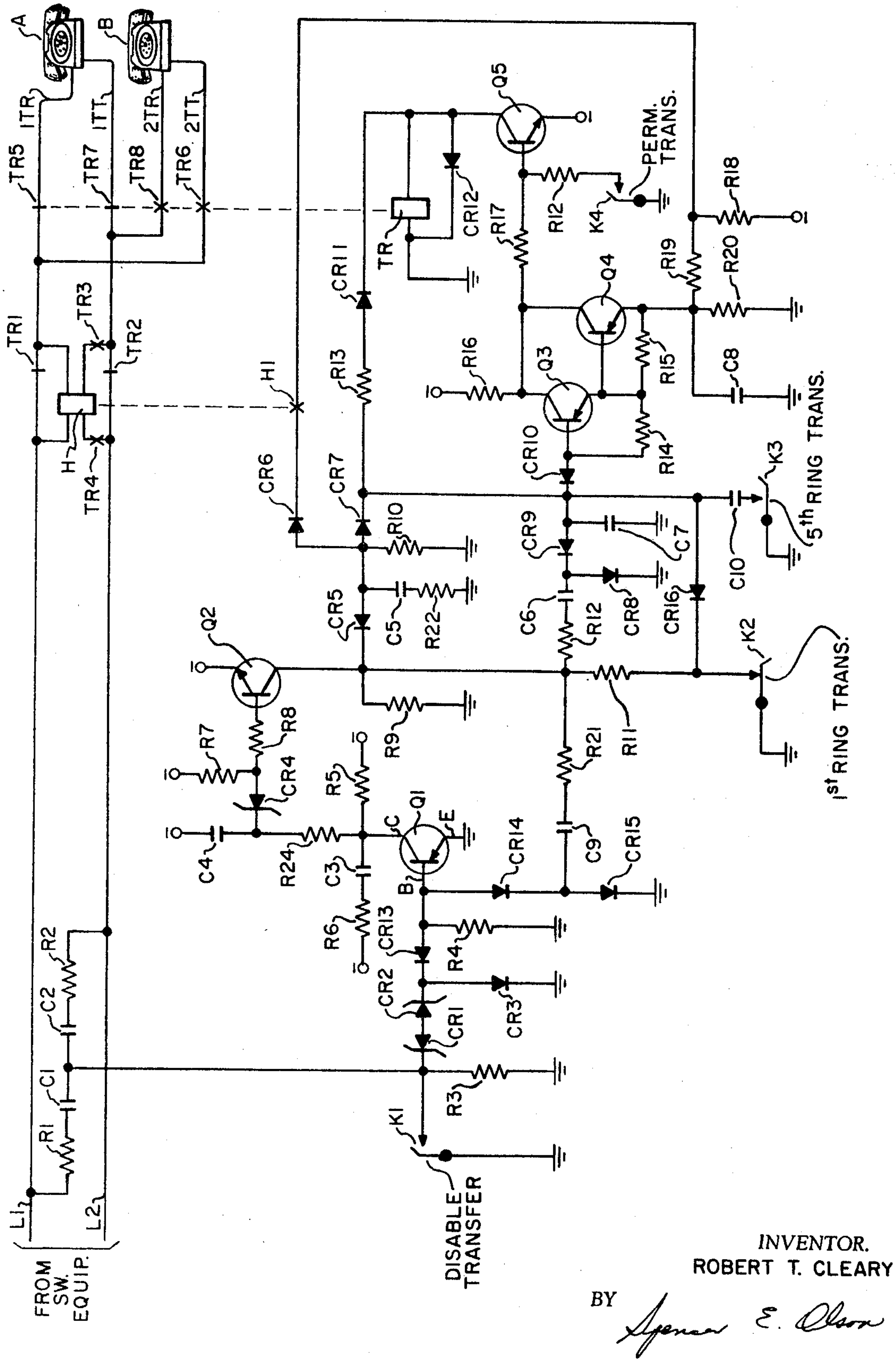
INVENTOR.
ROBERT T. CLEARY
BY Spencer E. Olson
ATTY.

United States Patent Office 3,515,813

Patented June 2, 1970

3,515,813

TELEPHONE RINGING SIGNAL TRANSFER DEVICE

Robert T. Cleary, Lockport, Ill., assignor to Automatic Electric Laboratories, Inc., Northlake, Ill., a corporation of Delaware Filed Jan. 4, 1968, Ser. No. 695,723
Int. Cl. H04m 3/58
U.S. Cl. 179—84 6 Claims

ABSTRACT OF THE DISCLOSURE

A call transfer apparatus for location at the subscriber's premises, arranged to transfer the line terminals from a first unanswered telephone to a second telephone which is then rung. It includes a first-circuit to detect the ringing and another circuit to count the ringing periods; upon counting a preset number of ringing periods, a relay is operated to transfer the incoming terminals to those of the second station. The answering telephone will then operate a relay to maintain the transfer for the duration of the call.

BACKGROUND OF THE INVENTION

Field of the invention

This invention relates to improvements in telephone call transferring arrangements, and more specifically to an arrangement for use at a subscriber's premises, which with a single service line from a communication exchange, and two telephone stations, routes an incoming call to the primary station, then if the call is not answered it is transferred to the second station.

Description of the prior art

The type of facility, most commonly used to provide a similar service is the secretarial answering cabinet, with which the attendant generally waits for several rings to allow enough time for the called party to answer. After a predetermined number of rings the attendant will answer the call. This system, too, has some drawbacks. The attendant is usually called upon to perform other functions, such as typing and must be sufficiently attentive to the signals to keep a mental count of the rings so as to avoid a premature or a delayed answer. Should a number of calls come in simultaneously they may result in confusion in attempting to properly answer them. Further, there is the possibility that the attendant may eavesdrop or make unauthorized outgoing calls.

Another arrangement now available and capable of connecting the line conductors to a second subscriber set, whereby the second station's ringer is activated and the call may be answered from this second station is disclosed in Pat. No. 3,176,082 of N. E. Nilsson. This arrangement is an electromechanical device, and is limited in its application, since the power for the operation of its circuit components must be supplied by the ringing signal.

Still another arrangement for providing this service is the "telephone answering system" where the common equipment at the answering bureau is connected to the subscriber's line at the central office. This equipment includes apparatus to alert the attendant there, after a preset number of rings of the subscriber's set, to answer the call. A typical system of this type is disclosed in Pat. No. 3,341,663 of V. R. De Stefano.

SUMMARY OF THE INVENTION

The circuit, according to the invention, transfers the line conductors from a primary station to a secondary station when an incoming call is not answered within a preset number of rings. This is accomplished, without drawing appreciable energy from the line ringing signal, by the use of a Zener diode ringing signal detector. This arrangement provides immunity from noise, and does not affect the speech level as did earlier circuits. The timing is provided by charging a first capacitor in response to each ringing period, which capacitor after the cessation of each ringing interval transfers the charge to a second larger capacitor. This second capacitor, upon reaching a preset level, triggers a second relay driver amplifier to operate the transfer relay, and transfer the line conductors to the second station.

BRIEF DESCRIPTION OF THE DRAWING

The novel features which are believed to be characteristic of the invention both as to its organization and method of operation will be more apparent from the following detailed description taken in conjunction with the single figure of the drawing which shows a circuit of the ringing signal transfer device.

DESCRIPTION OF THE PREFERRED EMBODIMENT

The drawing discloses the two conductors L1 and L2 of a telephone line connected to the terminals 1TR, 1TT of a primary telephone station A and a secondary telephone station B which is connectable to this line at its terminals 2TR, 2TT. Station B may be another telephone or even a telephone answering facility on the premises of the primary subscriber. The secondary station is only connected to the telephone line conductors upon the operation of a transfer relay TR. Relay TR is normally unoperated until the associated circuit shown has counted a preset number of rings during which the primary station has not answered. The relay TR then operates to operate the make contacts TR8 and TR6, shown as two short crossed lines diagonally intersecting, to connect station B to conductors L1 and L2, respectively. Break contacts TR5 and TR7, shown as a short line perpendicular to the conductor, are provided to disconnect telephone station A, while contacts TR1, TR3 and TR4 serve to connect relay H into the line, in series with telephone station B. Relay H is a hold relay that is operated upon answer of a call by station B to maintain relay TR operated by the closing of a holding circuit at its make contacts H1. Relay H is not normally maintained in the circuit, because of the possible detrimental electrolysis that could develop from the standing potential between its two windings.

The remainder of the circuit shown is effective to: detect the ringing, by the components centered about Zener diodes CR1 and CR2; form a D.C. pulse corresponding to the ringing interval, by the components associated with transistors Q1 and Q2; count the ringing cycles, by the components associated with capacitors C6 and C7; and after the preset ringing cycles have been counted, amplify the output of the counting circuit, by the amplifier consisting of the transistors Q3, Q4 and Q5 with their associated components.

The line conductors L1 and L2 are connected, through a balanced network composed of resistor R1, capacitors C1 and C2, and resistor R2, at the junction between the capacitors C1 and C2, to the ring detection portion of the circuit. This manner of coupling to the line reduces the effect of ground currents on the voice path and increases the immunity to response from dial transients, since they are relatively balanced on both sides of the line, while the ringing signal is applied to only one side of the line. The junction of these two capacitors C1 and C2 is connected through resistor R3 to ground, and through the back-to-back connected Zener diodes CR1 and CR2 and diode CR13 to the base of transistor Q1. The base of transistor Q1 is also connected to ground potential through resistor R4. The Zener diodes and resistor R3 set the voltage threshold, while diode CR13 couples the negative half-cycles of the ringing signal to the transistor for amplification. Diode CR3 provides a path for the positive half-cycles of the ringing signal to ground. Transistor Q1 has its emitter connected to ground potential, while the collector of Q1 is connected to a negative potential through resistor R5. Also connected from the collector of transistor Q1 to a negative potential is a capacitor C3 and resistor R6 in series, and a resistor R24 and capacitor C4. The junction of capacitor C4 and resistor R24 is coupled through a Zener diode CR4 to a negative potential via resistor R7 and to the base of transistor Q2 through resistor R8. Transistor Q1 is switched to a fully conductive state during each of the negative half-cycles of the ringing current to charge capacitor C3 and partially charge capacitor C4. After about 250 milliseconds, capacitor C4 charges to a sufficient level to cause Zener diode CR4 to conduct. The conduction by Zener diode CR4 transfers an appropriate potential to switch transistor Q2 to a fully conductive state. The emitter of transistor Q2 is connected to a negative potential and the collector is connected to a ground potential through resistor R9. To ensure that transistor Q2 remains conductive during the entire ringing interval a network consisting of resistor R21, capacitor C9 and a diode CR14 is connected from the collector of Q2 to the base of transistor Q1 to provide additional drive to transistor Q1. Diode CR15 connected to the junction of CR14 and C9 provides a discharge path for capacitor C9.

When the ringing interval ceases, transistor Q1 ceases to conduct and in turn permits transistor Q2 to return to a non-conductive state. Thus, for each interval of the alternating current ringing signal, transistor Q2 is made conductive to form a direct current pulse for practically the entire duration of the ringing interval.

The DC pulse output taken from transistor Q2 has two primary functions: one, to drive the counting part of the circuit, and two, to drive the time out part of the circuit. The pulse counting is accomplished by the serial network connected from the collector of Q2 consisting of resistor R12, capacitor C6, diode CR9 and capacitor C7 to ground. Diode CR8 connected to the junction of capacitor C6 and diode CR9 is provided merely for discharging the timing capacitors C6 and C7. In operation, each negative pulse from transistor Q2 charges the capacitor C7 through capacitor C6. Because C6 is much smaller in capacity than capacitor C7, the latter capacitor is charged only a small amount for each pulse from transistor Q2. After a number of pulses, each corresponding to a ringing cycle, capacitor C7 is charged sufficiently to forward bias diode CR10, which is connected from capacitor C7 to the base of transistor Q3. Transistor Q3 has its emitter connected to the base of the following transistor Q4. The collectors of Q3 and Q4 are connected together and through a resistor R16 connected to a negative potential, they are also connected through resistor R17 to the base of the final amplifier transistor Q5. Transistors Q3 and Q4 each have a resistor R14 and R15, respectively connected between their base and emitter. The emitter of transistor Q4 is connected through resistor R20 to ground. This configuration of transistors Q3 and Q4 provides a high impedance input to the counting circuit. When transistor Q3 is turned on, it in turn turns on transistor Q4 which in succession turns on transistor Q5. The operation of transistor Q5 to full conduction operates relay TR, to transfer the line to the secondary station. When transistor Q5 is conducting it has a collector path through diode CR11 and resistor R13 to the cathode end of diode CR10. This permits the negative voltage at the collector of transistor Q5 to have a current flow through to the base of transistor Q3, maintaining transistor Q3 in a fully conductive state. Relay TR is also operated by the current flow through transistor Q5 to transfer the line conductors from station A to station B.

The line remains connected to this secondary station, which will continue to ring. If the secondary station does not answer, and the call is abandoned, the ringing intervals will cease. The time out circuit will then come into use.

The time out circuit consists of diode CR5 with its cathode connected to the collector of transistor Q2 and its anode to capacitor C5 in series with resistor R22 to ground. Resistor R10 across capacitor C5 to ground is provided as a discharge path for the capacitor. Capacitor C5 is charged during each ringing interval and begins to discharge during the silent interval. If the ringing signal occurs at a normal rate, capacitor C5 will not discharge sufficiently to affect circuit operation. If the ringing signal ceases, the discharge of capacitor C5 through resistor R10 causes the path from ground through resistor R10 to remove the bias from transistor Q3 and thus release relay TR. Capacitor C5 then discharges sufficiently to discharge capacitor C7 to prepare the circuit for the next call.

If the call were answered by the secondary station, line current would operate relay H. A make contact H1 on relay H holds capacitor C5 charged to an intermediate voltage, to prevent time out. Time out will occur approximately three seconds after the secondary station goes on-hook. This delay is provided to prevent false release in the event that the hook switch is fumbled upon answering and to allow for "dial one" transfer of a hook switch flash from the secondary station without release, back to the primary station. The voltage for maintaining C5 charged to an intermediate value is obtained from the voltage divider network comprising resistors R18, R19 and R20 connected between battery and ground with the voltage taken off at the point between resistors R18 and R19.

Various options may be provided to make this circuit more flexible for the user. Among some of the simple options that are available, is the provision of a disable-transfer key K1 which will, upon being operated, place a ground shunting resistor R3, which will then prevent transistor Q1 from being turned on. Another option is that of transferring the call after the first ring is detected. This is done by placing a resistor R11 from the collector of transistor Q2 through diode CR16 to the capacitor C7. A ground connected key K2 is then connected to the junction between resistor R11 and diode CR16, which upon breaking the ground circuit will permit the DC pulse from Q2 to directly charge capacitor C7. Still another variation to increase the number of rings after which the line is transferred to station B is the placing of a second capacitor C10 in parallel with C7 by the operation of key K3 to connect the other terminal of this additional capacitor C10 to ground. This increased effective capacity of the combination of C7 and C10 will take a longer time to charge and thus increase the interval after which transistor Q3 will be turned on. Still another option is to omit contacts TR5 and TR7 of the transfer relay, or to provide straps to bypass them, so that station A remains connected after the transfer relay operates in addition to station B being connected.

An operative embodiment of the circuit illustrated in FIG. 1 has been constructed and successfully operated with the following component values and a voltage supply of 24 v.

Resistors:
- R1, 2, 4, 6, 7, 9, 21—22K ohms
- R3—33K ohms
- R5, 11, 16—47K ohms
- R8, 17—4.7K ohms
- R10—220K ohms
- R12—10K ohms
- R13, 15—1 megohm
- R14—10 megohms R18—511 ohms
R19—221 ohms
R20—500 ohms
R22—2.2K ohms Capacitors:
C1, C2—.25 mf.
C3, C9—1 mf.
C4, C8—10 mf.
C5—47 mf.
C6—.5 mf.
C7—2 mf.
C10—.8 mf.

Transistors:
Q1, Q3, Q4—2N721
Q2, Q5—2N697

Diodes:
CR1, CR2—1N966B
CR3, CR5 through CR16—1N645
CR4—1N960B

With the above components the circuit of FIG. 1 functioned to transfer the line conductors to the second station after one, four, or five ringing periods according to which of the optional keys were operated or unoperated.

Various changes and alternative implementations will now occur to those skilled in the art without departing from the true spirit and scope of the invention. Accordingly, it is not intended that the invention be limited to that which has been particularly shown and described except as such limitations appear in the appended claims.

What is claimed is:

1. In a telephone system including a subscriber's first set connected to a line and a subscriber's second set connectable to said line, a circuit for transferring ringing signals received on said line to said second set, said circuit comprising, a ringing signal detector operative upon detection of ringing current to operate a pulse amplifier to charge a first capacitor and partially charge a second capacitor, and switching means operated upon said second capacitor becoming fully charged after a predetermined number of rings to transfer said line to said subscriber's second set whereby it will respond to subsequent ringing signals.

2. Apparatus according to claim 1 wherein said switching means includes a transfer relay operated to transfer the conductors of said line from said first set to said second set.

3. Apparatus according to claim 1 wherein said ringing signal detector comprises; a pair of anode-to-anode connected Zener diodes and a rectifier, with the cathode of one Zener diode connected to said line, and the cathode of the other Zener diode connected to the cathode of said rectifier, with the anode of said rectifier connected to said pulse amplifier, whereby said ringing signal detector responds only to voltages above the threshold of said Zener diodes.

4. Apparatus according to claim 1 wherein said pulse amplifier comprises a first PNP transistor and a second NPN transistor with means to supply bias potential to each of said transistors to maintain them in a normally non-conductive state, a resistor and Zener coupling diode in series connected between the collector of the first transistor and the base of the second transistor, the base of said first transistor connected to the output of said ringing signal detector, a first capacitor connected between the collector of said first transistor and a source of negative potential, a resistor and a second capacitor also connected from the collector of said first transistor, whereby said resistor and said first and second capacitors and said Zener coupling diode delay the switching of said second transistor for a fixed interval to prevent operation thereof in response to transients.

5. Apparatus according to claim 4 further including a series resistor, capacitor and diode in a feedback path from the collector of said second transistor to the base of said first transistor, thereby insuring fully saturated operation thereof.

6. Apparatus according to claim 2 further including a hold relay in series with the line conductors, operated upon answer by said second set, to maintain said transfer relay operated.

References Cited

UNITED STATES PATENTS

| | | | |
|---|---|---|---|
| 1,360,722 | 11/1920 | Clausen. | |
| 3,176,082 | 3/1965 | Nilsson | 179—84 |
| 3,363,063 | 1/1968 | Kandel et al. | |

KATHLEEN H. CLAFFY, Primary Examiner

W. A. HELVESTINE, Assistant Examiner

U.S. Cl. X.R.

179—18